(12) United States Patent
Rubin

(10) Patent No.: US 6,796,219 B1
(45) Date of Patent: Sep. 28, 2004

(54) AUTOMATIC BASTER

(76) Inventor: Hal Rubin, 14 Dann Farm Rd., Pound Ridge, NY (US) 10576

( * ) Notice: Subject to any disclaimer, the term of this patent is extended or adjusted under 35 U.S.C. 154(b) by 0 days.

(21) Appl. No.: 10/388,148

(22) Filed: Mar. 13, 2003

(51) Int. Cl.[7] .................................................. A47J 37/10
(52) U.S. Cl. .............................. 99/346; 99/535; 99/532
(58) Field of Search ........................ 99/346, 345, 347, 99/532, 535, 516

(56) References Cited

U.S. PATENT DOCUMENTS

| | | | |
|---|---|---|---|
| 2,966,839 A | * | 1/1961 | Ferrara et al. ................. 99/346 |
| 3,224,362 A | * | 12/1965 | Kozar ........................... 99/346 |
| 3,311,048 A | * | 3/1967 | Pickering ....................... 99/346 |
| 4,066,010 A | * | 1/1978 | Larsson ......................... 99/346 |
| 4,439,459 A | * | 3/1984 | Swartley ....................... 426/438 |
| 5,913,965 A | * | 6/1999 | Gargano ......................... 99/346 |

* cited by examiner

Primary Examiner—Reginald L. Alexander
(74) Attorney, Agent, or Firm—Joseph P. Quinn; Brown Rudnick Berlack Israels LLP

(57) ABSTRACT

A method and apparatus for automatically basting a roasting item in an oven. A pump apparatus disposed outside of the oven provides pressure to a system of tubes which collect pan drippings and gravy (juices) from the bottom of a pan and dispense the drippings over a food item being roasted. A reservoir is provided in outside of the oven for addition of fluids to the roasting pan via the system of tubes. The reservoir is transparent for visually checking the fluid level without opening the oven. The pump apparatus is controllable manually or by an automatic timer for controlling the rate and timing of basting.

18 Claims, 2 Drawing Sheets

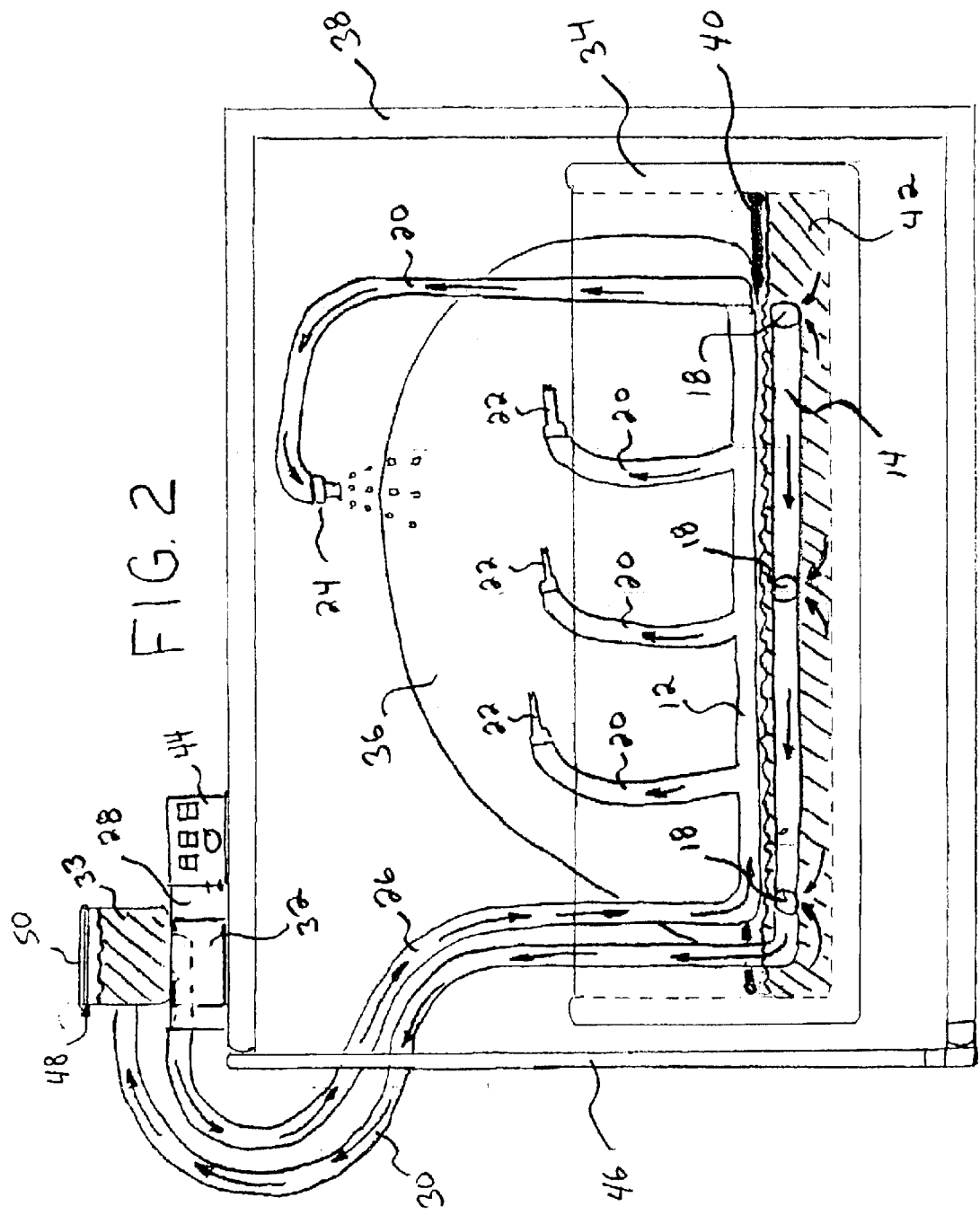

AUTOMATIC BASTER

FIELD OF THE INVENTION

The present invention relates to cooking apparatus and more particularly to an apparatus for automatic basting of a roasting food item.

BACKGROUND OF THE INVENTION

It is well known to baste various food items such as turkeys and roasts to prevent drying while the food item roasts in an oven. Manual methods of basting such as spooning drippings from a roasting pan over the food item or extracting and expelling drippings using a conventional manual baster requires the constant attention of a cook. Excessive time is often allowed to elapse before basting resulting in the accidentally drying of the food being roasted. It would therefore be desirable to provide a method and apparatus for basting food without requiring a the constant attention and intervention of a cook.

U.S. Pat. No. 5,913,965 to Gargano, (hereinafter referred to as "Gargano '965") describes an automatic baster for a roasting pan that includes an elevated assembly for raising juices and gravy from the bottom of the roasting pan over a food item during roasting of the food item. Gargano '965 describes a juice and gravy raising assembly consisting of a plurality of elongated curved flexible tubes that extend over meat. However, the Gargano '965 apparatus relies on convection to raise juice and gravy up through the plurality of tubes that extend over the meat being roasted. The rate of circulation of juices is virtually uncontrollable so the Gargano '965 apparatus is likely to over-baste or under-baste a roasting item in many instances.

Since only the low pressure of convection is applied inside of the circulation tubes of the Gargano '965 apparatus, deposits of grease from juices and gravy can accumulate and block the tubes. It would therefore be desirable to provide an apparatus that and provides controllable circulation of juices and sufficient pressure to reduce grease accumulations in circulation channels.

Another drawback of the Gargano '965 apparatus and other basting devices heretofore known is that addition of fluids and adjustments to the basting device require a user to open the oven door thereby releasing heat and moisture from the oven. In many instances, the a roasting pan becomes dry when the drippings and/or gravy evaporates before being replenished. A person must typically open the oven to check the level of fluid in the gravy or drippings (juices) in the roasting pan. The release of heat and moisture from an oven can be detrimental to the flavor and/or texture of the food item being roasted and can result in longer cooking times. Furthermore, opening the oven door is detrimental because opening or reaching into a hot oven increases the risk of burn injury. It is therefore be desirable to provide an automatic baster which allows monitoring of fluid level and adjustment of fluid flow rate without opening the oven.

SUMMARY OF THE INVENTION

The present invention provides a method and apparatus for automatically basting a roasting item in an oven. A pump apparatus disposed outside of the oven provides pressure to a system of tubes which collect pan drippings and gravy juices) from the bottom of a pan and dispense the drippings over a food item being roasted. A reservoir is provided in outside of the oven for addition of fluids to the roasting pan via the system of tubes. The reservoir is transparent for visually checking the fluid level without opening the oven. The pump apparatus is controllable manually or by an automatic timer for controlling the rate and timing of basting.

An illustrative embodiment of the invention provides an automatic baster including a collection conduit configured to collect juices from a roasting pan. The baster also includes a dispensing conduit configured to dispense juices onto a roasting item disposed in the roasting pan wherein the dispensing conduit includes at least one injector configured for injecting juices into the roasting item and at least one drip head configured for dispensing juices onto the exterior of the roasting item. The dispensing conduit also includes at least one flexible tubing branch adaptable to dispense fluids to a particular location on the roasting item.

The collection conduit is configured to provide a fluid flow path from the roasting pan to the dispensing conduit. The collection conduit includes a flexible tubing loop disposed adjacent to a bottom surface of the roasting pan and a plurality of intake ports for collecting juices from the bottom of the roasting pan.

A pump is disposed in fluid communication with the dispensing conduit and the collection conduit and provides pressure in the conduits causing the juices to flow from the collection conduit to the dispensing conduit. The pump is configurable for operation outside of an oven while the roasting pan is disposed in the oven.

A reservoir is disposed in fluid communication with the dispensing conduit and the collection conduit. The reservoir includes an orifice adapted to accept additional fluids to the baster and is configurable outside of an oven while the roasting pan is disposed in the oven.

In another illustrative embodiment of the invention an apparatus for automatically basting a roasting item includes a collection conduit configured as an outer loop disposed adjacent to the bottom of a roasting pan. The collection conduit includes at least one intake port adaptable for submersion in juice accumulating in the roasting pan.

A dispensing conduit is configured as an inner loop disposed adjacent to the bottom of a roasting pan and separated from the collection conduit by rigid spacers attached between the collection conduit and the dispensing conduit. In at least one illustrative embodiment, the apparatus includes a plurality of injection needles in communication with the dispensing conduit and adapted for injecting juices into a plurality of specific locations in a roasting item. At least one drip head can be provided in communication with the dispensing conduit and adapted for disposing juices onto specific locations of the roasting item.

Another illustrative embodiment of the invention includes an inflow conduit in communication with the dispensing conduit and providing a fluid pathway between a pump apparatus and the dispensing conduit and an outflow conduit in communication with the collection conduit. The illustrative embodiment also includes a fluid pathway between the pump apparatus and the collection conduit. The pump apparatus can be disposed outside of the oven while the dispensing conduit and the collecting conduit is disposed inside of the oven.

Another illustrative embodiment of the invention includes a pump apparatus having a reservoir in communication with the outflow conduit and the inflow conduit. The pump apparatus provides pressure to the reservoir which causes juices to be collected into the collection conduit and dispensed by the dispensing conduit. The pump apparatus can be adjusted for controlling the rate of fluid flow to the dispensing conduit. The reservoir includes an orifice disposed in a wall of the reservoir for addition of fluids to the apparatus and closable by a removable cover. It is desirable that the reservoir is made from a transparent material for viewing a fluid level therein.

Still another illustrative embodiment of the invention provides an automatic baster including pump means mountable outside of an oven. Conduit in communication with the pump means is adapted for circulating fluids from a bottom surface of a roasting pan disposed in the oven, to a selected locations of on or within a roasting item in the roasting pan in response to pressure applied by the pump means. A timer is provided with a control output connected to the pump means for controlling timing of the pump means.

The present invention overcomes the drawbacks of the prior art by providing a method and apparatus for basting food without requiring a the constant attention and intervention of a cook. The present invention features controllable circulation of juices and sufficient pressure to reduce grease accumulations in circulation channels. The present invention also provides an automatic baster which allows monitoring of fluid level and adjustment of fluid flow rate without opening the oven.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings, as set forth below.

FIG. 2 is perspective of an automatic baster according to at least one embodiment of the present invention.

DETAILED DESCRIPTION

Figure 1:
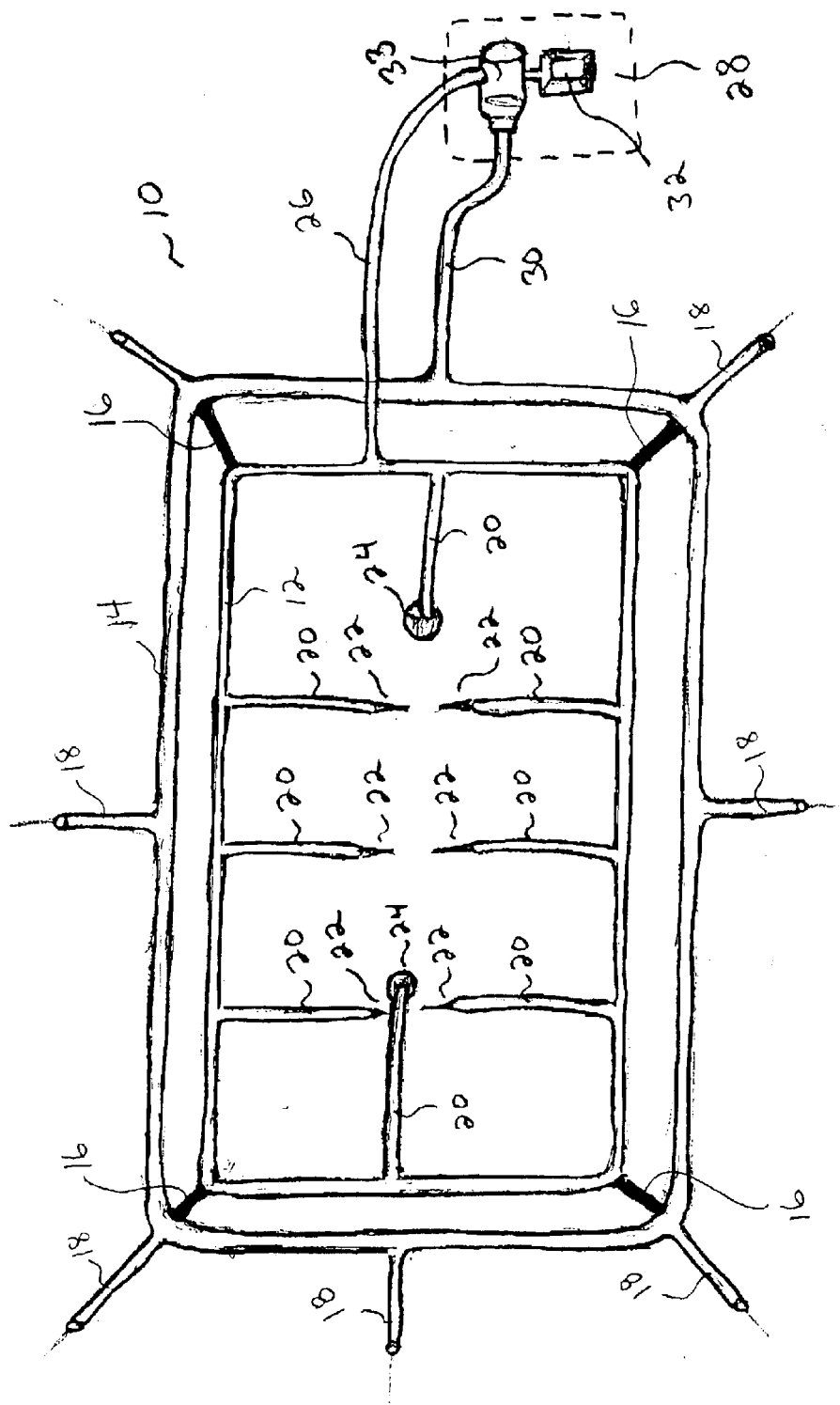
FIG. 1 is a top view of an automatic baster according to at least one embodiment of the present invention.

The following discussion includes a description of the automatic basting apparatus, in accordance with the principles of the present disclosure. Reference will now be made in detail to the exemplary embodiments of the disclosure, which are illustrated in the accompanying figures.

Turning now to the figures, wherein like components are designated by like reference numerals throughout the several views, the exemplary embodiments of the automatic basting apparatus and methods of use disclosed are discussed in terms of an automatic baster disposed in a roasting pan in a conventional oven and more particularly, in terms of an automatic basting apparatus having a pump apparatus disposed outside of the oven and which may be employed with alternately configured fluid conduits.

Referring initially to FIG. 1, an automatic baster 10 includes a dispensing conduit 12 configured as an inner loop and a collection conduit 14 configured as an outer loop. In an illustrative embodiment, rigid spacers 16 are attached between the inner loop to provide separation therebetween and provide stiffness and form to the conduit structure. A plurality of intake ports 18 extend from the collection conduit 14. A plurality of flexible branches 20 extend from the dispensing conduit 12. In the illustrative embodiment, an injection needle 22 is disposed in the end of at least one of the flexible branches 20. A drip head 24 can alternatively be installed in at least one of the flexible branches 20.

An inflow conduit 26 connects a pump apparatus 28 to the dispensing conduit 12. An outflow conduit 30 connects the collecting conduit 14 to the pump apparatus 28. In the illustrative embodiment, the pump apparatus includes a pump 32 in fluid communication with a reservoir 33.

Referring now to FIG. 2, a roasting pan 34 holds a roasting item 36 inside of an oven 38. In the illustrative embodiment, the roasting pan 34 includes a rack 40 to elevate and support the roasting item 36 and create clearance space for accumulation of gravy and pan drippings (hereinafter referred to collectively as "juices" 42).

Intake ports 18 are disposed at the bottom of the roasting pan 34 so that they are substantially submersed in the juices 42. Collection conduit 14 and outflow conduit 30 create a path for juices 42 to flow from the roasting pan 34 to the reservoir 33. The pump apparatus 28 including a pump 32 provide pressure to the conduit system to circulate the juices 42. Dispensing conduit 12 and inflow conduit 26 create a path for juices 42 to flow from the reservoir 33 to flexible branches 22 and to the roasting item 36. Injection needles 22 create a path for juices to flow from flexible branches 22 into the roasting item 36. A drip head 24 is configured to cause fluid to drip from flexible branches 22 onto the roasting item 36.

In the illustrative embodiment, a timer 44 can be functionally connected to the pump apparatus 28 to control pump timing and pressure and thereby regulate basting of the roasting item 36.

A user can configure the automatic baster 10 according to the present invention before placing the roasting pan 34 in the oven 38. A roasting item 36 can first be placed in the roasting pan. Next, the user can place the conduit system of the automatic baster 10 over the roasting item 36 so that the collection conduit 14 and intake ports 18 lie substantially against the bottom of the roasting pan 34.

Alternatively, the conduit system of the automatic baster 10 may be first installed in the roasting pan 34, or may be permanently attached to a roasting pan 34. Flexible branches 20 can be bent away from the center of the roasting pan 34 to allow placement of the roasting item 36 in the roasting pan 34. After the roasting item 36 is placed in the roasting pan 34 and the conduit system is installed in the roasting pan 34, the flexible branches 20 can be moved to desired basting cites on the roasting item 36.

In illustrative embodiments of the invention, an injection needle 22 disposed at the end of at least one of the flexible arms 20 is inserted into the basting item 36 to provide juices 34 internally to the basting item 36. Alternatively or additionally, a drip head 24 is disposed at the end of at least one of the flexible arms 20 for dripping juices 42 onto the external surface of a roasting item 36.

The roasting pan 34 containing the roasting item 36 and conduit system of the invention is then placed inside an oven 38. Inflow conduit 26 and outflow conduit 30 are configured to carry juices 42 between the roasting pan 34 and the pump apparatus 28 which is disposed outside of the oven. In one implementation of the invention, the oven door 46 is left ajar to provide clearance space for the inflow conduit 26 and the outflow conduit 30. In an alternative implementation, the inflow conduit 26 and the outflow conduit 30 are drawn through an orifice (not shown) in an oven wall. A desired volume juices 42 can be placed in the roasting pan before or after the roasting pan is placed in an oven 38.

Additional juices are added to the reservoir 33 via the orifice 48 of the reservoir 33. A removable cover 50 is optionally provided to prevent juices from splashing out from the reservoir 33. In at least one implementation of the present invention, the user fills the inflow channel via the reservoir. The user then energizes the pump 32 while priming the pump 32 by continuing to add juices 42 to the reservoir 33 until juices 42 return to the reservoir 33 in the outflow conduit 30. An appropriate volume of additional juices 42 can then be added to the reservoir 33 to replace juices 42 that will typically be lost through evaporation or other system leaks.

The pump 32 may be left in an energized state at a preselected pressure setting or may be periodically energized for short periods by a user. Alternatively, a timer 44 can be configured to energize the pump 32 at preselected times and preselected flow rates. In the illustrative embodiment, the reservoir 33 is made from transparent materials so that the user can monitor the volume of juices 42 in the roasting pan 34 and conduit system. The user can add juices 42 to the reservoir 33 to replenish the juices 33 to an appropriate level, without opening the oven door 46.

The conduits and flexible branches 20 of the invention can be manufactured using any number of heat resistant materials such as high temperature thermoplastic tubing or flexible metal tubing. The pump apparatus 28 can include any type of common fluid pumping device suitable for pumping oily materials and suitable for use in food production applications. In at least one embodiment, the pump 32 must be controllable by an external timer 44. Alternatively, a pump 32 having a built in timer can be employed.

Although the various embodiments of the invention are described herein including injection needles 22 installed in flexible branches 20, persons having ordinary skill in the art should appreciate that the flexible branches 20 themselves can serve as injection needles 22 if they include ends that are shaped for piercing into a roasting item 36.

Although the various embodiments of the invention are described herein including drip-heads 24 installed in flexible branches 20, persons having ordinary skill in the art should appreciate that in many implementations of the invention, the flexible branches 20 themselves can serve as drip heads 24 without the need for a particularly shaped element inserted therein.

Although the invention has been shown and described with respect to exemplary embodiments thereof, persons having ordinary skill in the art should appreciate that various other changes, omissions and additions in the form and detail thereof may be made therein without departing from the spirit and scope of the invention.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. An automatic baster comprising:
   a collection conduit configured to collect juices from a roasting pan
   a dispensing conduit configured to dispense juices onto a roasting item disposed in said roasting pan;
   wherein said collection conduit is configured to provide a fluid flow path from said roasting pan to said dispensing conduit;
   a pump in fluid communication with said dispensing conduit and said collection conduit and providing pressure in said conduits causing said juices to flow from said collection conduit to said dispensing conduit;
   wherein said dispensing conduit comprises at least one injector configured for injecting juices into said roasting item.

2. The automatic baster according to claim 1 wherein said pump is configurable for operation outside of an oven while said roasting pan is disposed in said oven.

3. The automatic baster according to claim 1 further comprising a reservoir in fluid communication with said dispensing conduit and said collection conduit wherein said reservoir includes an orifice adapted to accept additional fluids to said baster.

4. The automatic baster according to claim 3 wherein said reservoir is configurable outside of an oven while said roasting pan is disposed in said oven.

5. The automatic baster according to claim 1 wherein said dispensing conduit comprises at least one drip head configured for dispensing juices onto the exterior of said roasting item.

6. The automatic roaster according to claim 1 wherein said dispensing conduit comprises at least one flexible tubing branch adaptable to dispense fluids to a particular location on said roasting item.

7. The automatic roaster according to claim 1 wherein said collection conduit comprises a flexible tubing loop disposed adjacent to a bottom surface of said roasting pan and including a plurality of intake ports for collecting juices from the bottom of said roasting pan.

8. An automatic baster comprising:
   a collection conduit configured to collect juices from a roasting pan
   a dispensing conduit configured to dispense juices onto a roasting item disposed in said roasting pan;
   wherein said collection conduit is configured to provide a fluid flow path from said roasting pan to said dispensing conduit;
   a pump in fluid communication with said dispensing conduit and said collection conduit and providing pressure in said conduits causing said juices to flow from said collection conduit to said dispensing conduit;
   wherein said dispensing conduit comprises at least one flexible tubing branch adaptable to dispense fluids to a particular location on said roasting item;
   wherein said at least one of said flexible tubing branch terminates with an injector or drip head.

9. An automatic baster comprising:
   a collection conduit configured to collect juices from a roasting pan;
   a dispensing conduit configured to dispense juices onto a roasting item disposed in said roasting pan wherein said dispensing conduit comprises at least one injector configured for injecting juices into said roasting item and at least one drip head configured for dispensing juices onto the exterior of said roasting item and wherein said dispensing conduit comprises at least one flexible tubing branch adaptable to dispense fluids to a particular location on said roasting item;
   wherein said collection conduit is configured to provide a fluid flow path from said roasting pan to said dispensing conduit and wherein said collection conduit comprises a flexible tubing loop disposed adjacent to a bottom surface of said roasting pan and includes a plurality of intake ports for collecting juices from the bottom of said roasting pan; and
   a pump in fluid communication with said dispensing conduit and said collection conduit and providing pressure in said conduits causing said juices to flow from said collection conduit to said dispensing conduit wherein said pump is configurable for operation outside of an oven while said roasting pan is disposed in said oven; and a reservoir in fluid communication with said dispensing conduit and said collection conduit wherein said reservoir includes an orifice adapted to accept additional fluids to said baster and wherein said reservoir is configurable outside of an oven while said roasting pan is disposed in said oven.

10. An apparatus for automatically basting a roasting item comprising:

collection conduit configured as an outer loop disposed adjacent to the bottom of a roasting pan, said collection conduit including at least one intake port adaptable for submersion in juice accumulating in said roasting pan;

a dispensing conduit configured as an inner loop disposed adjacent to the bottom of a roasting pan and separated from said collection conduit by rigid spacers attached between said collection conduit and said dispensing conduit.

11. The apparatus according to claim 10 further comprising a plurality of injection needles in communication with said dispensing conduit and adapted for injecting juices into a plurality of specific locations in said roast.

12. The apparatus according to claim 11 further comprising at least one drip head in communication with said dispensing conduit and adapted for disposing juices onto specific locations of said roasting item.

13. The apparatus according to claim 12 further comprising:

an inflow conduit in communication with said dispensing conduit and providing a fluid pathway between a pump apparatus and said dispensing conduit;

an outflow conduit in communication with said collection conduit and providing a fluid pathway between said pump apparatus and said collection conduit; and wherein said pump apparatus is disposed outside of said oven, said dispensing conduit is disposed inside of said oven and said collecting conduit is disposed inside of said oven.

14. The apparatus according to claim 13 wherein said pump apparatus comprises a reservoir in communication with said outflow conduit and said inflow conduit and a pump providing pressure to said reservoir, said pressure causing juices to be collected into said collection conduit and dispensed by said dispensing conduit.

15. The apparatus according to claim 14 wherein said pump is adjustable for controlling the rate of fluid flow to said dispensing conduit.

16. The apparatus according to claim 14 wherein said reservoir includes an orifice closable by a removable cover, wherein said orifice is disposed in a wall of said reservoir for addition of fluids to said apparatus.

17. The apparatus according to claim 14 wherein said reservoir is made from a transparent material for viewing a fluid level therein.

18. An automatic baster comprising:

pump means mountable outside of an oven;

conduit in communication with said pump means, said conduit adapted for circulating fluids from a bottom surface of a roasting pan disposed in said oven, to a selected locations of on or within a roasting item in said roasting pan in response to pressure applied by said pump means; and a timer having a control output to said pump means for controlling timing of said pump means.

* * * * *